United States Patent
Shimoji et al.

[11] Patent Number: 5,960,138
[45] Date of Patent: Sep. 28, 1999

[54] BACKPLANE CONNECTOR

[75] Inventors: Naoko Shimoji, Ichihara; Masaaki Takaya; Shinji Nagasawa, both of Tokyo, all of Japan

[73] Assignees: Furukawa Electric Co., Ltd.; Nippon Telegraph and Telephone Co., both of Tokyo, Japan

[21] Appl. No.: 09/072,095

[22] Filed: May 4, 1998

[30] Foreign Application Priority Data

May 8, 1997 [JP] Japan ................................. 9-134278

[51] Int. Cl.⁶ .................................................. G02B 6/38
[52] U.S. Cl. ................................. 385/58; 385/53; 385/60
[58] Field of Search ............................. 385/53, 54, 55, 385/56, 57, 58, 69, 60, 72

[56] References Cited

U.S. PATENT DOCUMENTS

| | | | |
|---|---|---|---|
| 4,725,120 | 2/1988 | Parzygnat | 350/96.22 |
| 5,719,977 | 2/1998 | Lampert et al. | 385/60 |
| 5,828,804 | 10/1998 | Akins et al. | 385/58 |
| 5,887,095 | 3/1999 | Nagase et al. | 385/58 |

FOREIGN PATENT DOCUMENTS 0 430 107 A2  5/1991  European Pat. Off. .

*Primary Examiner*—Phan T. H. Palmer
*Attorney, Agent, or Firm*—Lacasse & Associates; Randy W. Lacasse; Wesley L. Strickland

[57] ABSTRACT

The backplane connector of the present invention can improve the fitting accuracy of the optical connectors A and B at the backplane 1 side and the package 2 side respectively and protect the backplane 1 from damages caused by being pressed against the first housing 3 when the first housing 3 is fit in the backplane 1. In the first housing 3 mounted floating in the backplane 1 is housed the second housing 7 by latching and connecting the latching projection 4 to the latching pawl 10, the backplane side optical connector plug 14 is incorporated in the second housing 7. And, the package side optical connector plug 23 is incorporated in the third housing 18 of the package 2. Then, the third housing 18 is inserted in the first housing 3, and the unlatching part 20 at the third housing 18 side presses down the tip side slope 13 of the latching pawl 10 to unlatch and disconnect the latching pawl 10 from the latching projection 4. In this status, the ferrules 16 and 25 of the backplane side and the package side optical connector plugs 14 and 23 are positioned and connected to connect the backplane 1 to the package 2 optically.

6 Claims, 5 Drawing Sheets

BACKPLANE CONNECTOR

FIELD OF THE INVENTION

The present invention relates to a backplane connector for connecting a package optically to a unit provided on the backplane side, for forming, for example, a communication cabinet, as a book-shelf type connection.

BACKGROUND OF THE INVENTION

In recent years, there have developed technologies of connecting a package being comprised of optical and electronic parts thereon to a backplane side unit comprised of optical and electric circuits formed thereon using a communication cabinet respectively. For example, one such technology, which connects a package to a backplane side unit using a single-fiber optical connector, is disclosed in Japanese Laid-Open Patent Publication No. 164704 of 1991.

OBJECT AND SUMMARY OF THE INVENTION

In recent years, however, a higher-fiber packing density has required more and more units and packages of communication cabinets. In order to meet such a requirement, an optical connection technology is needed to connect a package to a backplane side unit using a multi-fiber optical connector. And furthermore, the development of a backplane connector usable for connecting each of the prior art single-fiber optical connectors is also required.

In the case of each type of backplane connector, the optical connector attached to a package is connected to the connector attached to the object backplane side unit to realize an optical connection between the package and the backplane unit, but the aligning accuracy depends significantly on various factors such as errors in fixing packages and optical connectors, errors in fixing backplanes to optical connectors, the manufacturing errors of optical connectors used on both packages and backplanes, the errors of fitting parts on both optical connectors, etc. And, thus far there have been no backplane connectors provided that can solve the above errors satisfactorily.

Under such circumstances, it is an object of the present invention to solve the above problems and provide a backplane connector that allows a high packing density of parts to be mounted thereon and to be compacted significantly in size with excellent connection accuracy.

In order to achieve the above object, the present invention takes the following measures. They are; the backplane connector in an embodiment of the present invention comprises the first housing mounted floating on a backplane, opened at its tip, and having a locking latch on its wall surface; the second housing inserted in the first housing so that its tip opening is aligned to the tip opening of the first housing in the same direction and incorporating at least one backplane side optical connector plug; and the third housing having a package on its outside surface, being opened at its tip, incorporating a package side optical connector plug in itself, and having a locking pawl fit in the first housing and to be latched by the locking latch at a preset position. And, a latching projection is formed on the inner surface of the first housing. On the outer surface of the second housing, facing the latching projection-formed surface of the first housing, is formed a latching arm extended through a clearance toward the tip opening of the second housing along the outer surface of the second housing, and at the tip of the extended latching arm is provided a latching pawl having an engaging stepped portion, and protruded outside. The latching projection is engaged with this engaging stepped portion to latch and connect the first housing to the second housing. At this latching pawl is formed a two-shoulder stepped slope so that the inclination of the stepped portion becomes larger in the axial direction from the package side to the tip side. The third housing is provided with an unlatching part. When the third housing is fit in the first housing, the unlatching part comes into contact with the slope formed at the tip of the latching pawl so as to press the latching pawl down in the axial direction to unlatch the connection between the first housing and the second housing. While the first and second housings are disconnected in such a way, the optical connection between the backplane side optical connector plug and the package side optical connector plug is maintained. Thus, according to the first embodiment, the above prior art problems can be solved.

According to the second embodiment which takes the configuration of the first invention, two alignment pins are fit in a pair of alignment holes provided at the connecting end faces of the optical connector plugs provided on both sides to position and connect the backplane side optical connector plug and the package side optical connector plug respectively and solve the above problems.

According to the third embodiment which takes the configuration of the first embodiment each of the backplane side optical connector plugs and the package side optical connector plugs incorporates a ferrule having an optical fiber in its plug housing. The connecting end of the ferrule is pressed by a spring and protruded slide-ability from the tip of the plug housing. And, if d is defined as the overlapping area of the latched engagement between the latching projection of the first housing and the engaging stepped portion of the latching pawl of the second housing, $\Delta$ is defined as the interval between the plug housings at the backplane side and the package side when the third housing is fit in the first housing, $\theta_2$ is defined as the inclination of the 2-shoulder stepped slope of the latching pawl of the second housing on the package side, and $\theta_1$ is defined as the inclination on the same portion on the tip side, then the relationship between $\theta_1$ and $\theta_2$ becomes $0<\theta_2<\arc \tan (d/\Delta)<\theta_1<90°$. Thus, according to the second embodiment the above problems can be solved.

Furthermore, according to the fourth embodiment which takes the configuration of the second embodiment two alignment pins are fixed to the optical connector plug at either the backplane side or the package side, and the fixing force is set larger than the disconnecting force for the latched connection between the first housing and the second housing when the third housing is removed from the first housing and the force needed to unlock and remove the third housing from the first housing. Thus, according to the fourth embodiment, the above problems can be solved.

Furthermore, according to the fifth embodiment which takes the same configuration as that of the second or fourth embodiment and solves the above problems as follows; when the alignment pins provided on one side are fit in the alignment holes of the optical connector plug of either the backplane or the package and the protruded tips of the alignment pins are fit in the alignment holes of the other optical connector plug to position and connect the optical connector plugs at both the backplane side and the package side, then the relationship of $\delta\phi > \delta h/2 + (\delta h/L) \times (f+a)$ is satisfied if L is defined as the fitting length between the second housing and the third housing when the alignment pins protruded from one optical connector plug are fit in the alignment holes of the other optical connector plug, $\delta\phi$ is defined as the difference in the diameter of the tip of each protruded alignment pin from the diameter in each alignment hole in which an alignment pin is fit, δh is defined as the fitting clearance between the second housing and the third housing, f is defined as the protrusion length of the ferrule protruded from the plug housing, and a is defined as the protrusion length of each alignment pin protruded from the end face of the ferrule.

In the present invention, when the third housing is fit in the first housing by holding the package, the third housing is fit in the first housing, and then in the second housing.

When the third housing is further inserted deeply as described above, the connecting end faces of the optical connector plugs at both the backplane side and the package side, that are, the connecting end faces of the ferrules, are pressed to come in contact with each other. And, at this time, the locking pawl goes beyond the locking portion to be latched at the locking portion. On the other hand, the unlatching part of the third housing comes in contact with the larger inclination angle slope formed at the tip of the latching pawl of the second housing to press the latching pawl down in the axial direction. When the latching pawl is pressed down in such a way, the latching projection of the first housing is released from the engaging stepped portion of the latching pawl, so that the latched connection between the first housing and the second housing is released, and accordingly, the optical connection between the optical connector plugs at both the backplane side and the package side is kept while the latched connection between the first and second housings are unlatched.

When disconnecting the backplane connector, the package is held by hand to give a pulling-out force to the first housing. With this given pulling-out force, the unlatching part of the third housing is separated from the latching pawl, so that the latching pawl is returned to its initial position from its pressed-down position by an elastic force. Consequently, the engaging stepped portion of the latching pawl is engaged with the latching projection of the first housing, and the first housing is connected and latched to the second housing. Furthermore, when the third housing is pulled out and moved, the locking pawl of the third housing is released from the locking latch of the first housing, and accordingly, the first housing is unlocked from the third housing so that the third housing is removed from the first housing and the optical connection is disconnected from the backplane connector.

According to the present invention, when the package side third housing is fit in the first and second housings on the backplane side, the unlatching part of the third housing is used to unlatch the latching pawl of the second housing and disconnect the first housing from the second housing. Thus, after the disconnection, the first housing is free and even when the third housing is further inserted, the inserting force does not affect the backplane via the first housing. And accordingly, the present invention can prevent the characteristics of the optical and electric circuits on the backplane completely from degradation caused by the first housing pressed against the backplane.

Furthermore, since the slope provided on the outer surface of the latching pawl of the second housing is formed as a two-shoulder stepped portion being comprised of the package side slope and the tip side slope, as well as the inclination of the tip side slope is set larger than the inclination of the package side slope. Thus, the first housing can be unlatched from the second housing with a less pushing-in length after the unlatching part of the third housing comes in contact with the tip side slope. As a result, the fitting length of the second and third housings can be reduced according to the reduction of the pushing-in length. In addition, the backplane connector can be reduced in size significantly.

Moreover, since the inclination of the slope of the latching pawl on the package side is set smaller than that of the slope on the tip side, the force of reconnecting the first housing to the second housing can be reduced when the package side latching pawl is pulled out to remove the third housing from the first and second housings. And, the force of pulling the third housing out can be reduced according to the reduction of the reconnecting force so that the third housing is pulled out smoothly.

Furthermore, if, when d is defined as the overlapping area of the engagement between the latching projection of the first housing and the engaging stepped portion of the latching pawl of the second housing, the third housing is fit in the first housing, that is, when $\Delta$ is defined as the interval between the plug housings at the backplane side and the package side when the unlatching part of the third housing comes in contact with the tip side slope of the latching pawl of the second housing, then the relationship between the inclination $\theta_1$ of the tip side slope of the latching pawl of the second housing and the inclination $\theta_2$ of the package side slope is defined as $0<\theta_2<\arctan(d/\Delta)<\theta_1<90°$. Thus, it is possible to obtain an effect that the latched connection between the first housing and the second housing can be unlatched and disconnected completely before the backplane side optical connector plug housing comes in contact with the package side optical connector plug housing.

Furthermore, the relationship of $\delta\phi>\delta h/2+(\delta h/L)\times(f+a)$ is satisfied if L is defined as the fitting length between the second housing and the third housing when the alignment pins protruded from one optical connector plug are fit in the alignment holes of the other optical connector plug, $\Delta\phi$ is defined as the difference of the diameter of the tip of each protruded alignment pin from the diameter of each alignment hole in which an alignment pin is fit, δh is defined as the fitting clearance between the second housing and the third housing, f is defined as the protrusion length of the ferrule protruded from the plug housing, and a is defined as the protrusion length of each alignment pin protruded from the end face of the ferrule. Thus, when the backplane side connector is engaged with the package side connector, the alignment pins do not hit the edges of the alignment holes, so that it is possible to prevent completely the problem of alignment pins hitting the edges of the alignment holes and damaging the alignment holes.

Furthermore, since the present invention sets the fixing force of the alignment pins larger than the force for the latched reconnection between the first and second housings when the third housing is removed from the first housing and the force of unlatching and removing the third housing from the first housing, the problem with alignment pins, when the backplane connector is disconnected, receive the disconnecting force and are pulled out with force, can be prevented without fail.

BRIEF DESCRIPTION OF THE DRAWINGS

These and other objects and advantages of the present invention will become more apparent and more readily appreciated from the following detailed description of the exemplary embodiments of the invention taken in conjunction with the accompanying drawings, in which.

DETAILED DESCRIPTION OF THE PREFERRED EMBODIMENT

Figure 1A:
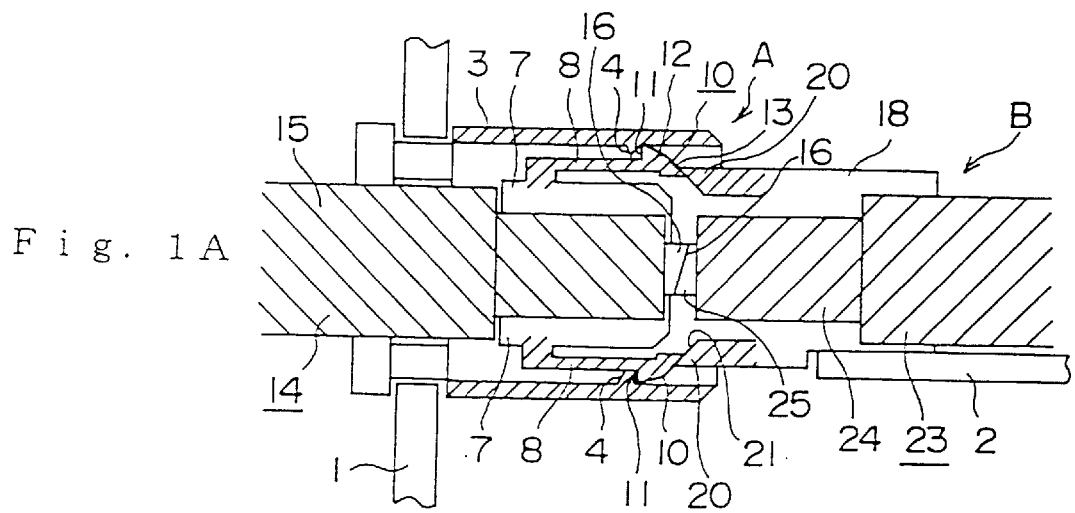
FIG. 1A to FIG. 1C illustrate a configuration of a backplane connector in an embodiment of the present invention, indicating how the first housing is unlatched from the second housing.

Hereunder, a preferred embodiment of the present invention will be described with reference to the attached drawings. FIG. 1A to FIG. 1C and FIG. 2A to FIG. 2B illustrate the major portion of the backplane connector in an embodiment of the present invention respectively. In each of those drawings, the backplane connector comprises an optical connector A at the backplane 1 side and an optical connector B at the package 2 side. On the backplane 1 are formed electric and optical circuits. On this backplane 1 is also mounted the first housing 3 floating. The configuration of the floating first housing 3 is well known, for example, in Japanese Laid-Open Patent Publication No. 164704 of 1991, etc. The first housing 3 is floating mounted on the backplane 1 using a proper configuration described in those patent applications.

The first housing 3 is opened at its tip. On the inner surface of the first housing 3 is formed a latching projection 4 protruded inside as shown in FIG. 1. On the surfaces (surfaces in the horizontal direction in FIG. 1) orthogonal to the surfaces on which the latching projection 4 of the first housing 3 is formed respectively is formed a locking latch 5 respectively as shown in FIG. 2 (represented as upper and lower faces in FIG. 2). Between the tip side of the first housing 3 and this locking latch 5 is provided a triangular running-on face 6 on both sides of the locking latch 5 in the width direction (orthogonal direction in FIG. 2) respectively.

In the first housing 3 is inserted the second housing 7 slide-ability. The second housing 7 is also opened at its tip and this opening of the second housing 7 is aligned to the opening of the first housing in the same direction.

Figure 7:
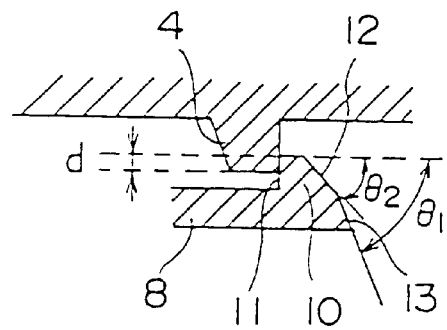
FIG. 7 illustrates the relationship between the inclinations $\theta_1$, $\theta_2$ of the two-shoulder stepped portion of the latching pawl and the overlapping area d in the latched connection in the above embodiment.

As shown in FIG. 1, a latching arm 8 is formed on the outer surface of the second housing 7, which faces the surface of the first housing 3, on which the latching projection 4 is formed. The base end of this latching arm 8 is connected to the second housing 7. The latching arm 8 is extended from this base end to the tip of the second housing 7 along the outer surface of the second housing 7 through a clearance formed between the outer surface of the second housing 7 and the outer surface of the first housing 3, which is in parallel to the outer surface of the second housing 7. At the tip of this extended latching arm 8 is formed a latching pawl 10. This latching pawl 10 is provided with an engaging stepped portion 11 protruded outside from the tip of the latching arm 8. On the outer surface of this latching pawl 10 is formed slopes 12 and 13 inclined more as they go closer to the tip in the axial direction of the second housing 7. The slope 12 is formed on the base end side and the slope 13 is formed on the tip side. The inclination $\theta_1$ of the tip side slope 13 is larger than the inclination $\theta_2$ of the base end side slope 12 as shown in FIG. 7.

A backplane side optical connector plug 14 is inserted in the second housing 7 through a hole formed in the backplane 1.

Figure 4:
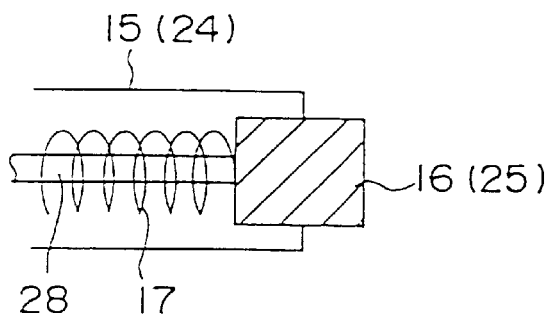
FIG. 4 is an exemplary view of the ferrule housed in a plug housing.

This backplane side optical connector plug 14 has a ferrule 16 housed in a plug housing 15 slide-ability in the moving direction on the tip side. And, as shown in FIG. 4, the ferrule 16 is pressed by a spring 17 forward, and the ferrule 16, resisting the force of the spring 17, can move backward in the plug housing 15.

On the outer surface of the third housing 18 is provided a package 2. This third housing 18 is opened at its tip, and as shown in FIG. 1, the third housing 18 is provided with an unlatching part 20 on the opposite side of the latching pawl 10 provided on the second housing 7. This unlatching part 20 is formed like a pawl having a slope 21 to run onto the slopes 12 and 13 of the latching pawl 10.

In addition, the third housing is provided with a locking pawl 22 as shown in FIG. 2 at a position facing the locking latch 5 provided on the first housing 3. This locking pawl 22 is latchingly engaged with the locking latch 5 at a preset fitting position with respect to the third housing 18 and the first housing 3.

Figure 3:
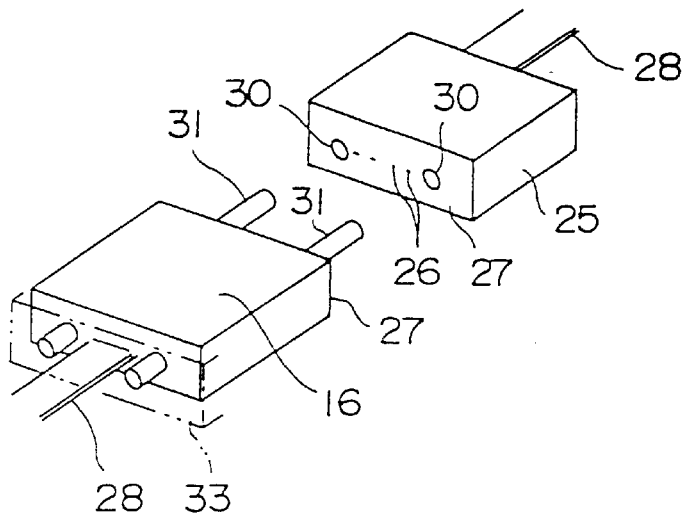
FIG. 3 illustrates a backplane side optical connector plug and a ferrule incorporated in a package side optical connector plug.

Inside the third housing 18 is incorporated a package side optical connector plug 23. This package side optical connector plug 23, just like the backplane side plug housing 15, houses a ferrule 25 slide-ability on the tip side of the package side plug housing 24. And, as shown in FIG. 4, this ferrule 25 is pressed by a spring 17 forward, and the ferrule 25, resisting the force of the spring 17, can move backward just like the ferrule 16 of the backplane side optical connector plug 14. FIG. 3 illustrates the relationship between the ferrule 16 of the backplane side optical connector plug 14 and the ferrule 25 of the package side optical connector plug 23. In each of the ferrules 16 and 25 are formed optical fiber inserting holes 26 arranged at equal pitches. In these optical fiber inserting holes 26 are inserted multi-fiber optical fiber cores 28 such as optical fiber ribbon, etc., which are unsheathed, so that those bare optical fibers are exposed to be made flush at the connecting end face of each of the ferrules 16 and 25. The ferrules 16 and 25 are adhered to each optical fiber core 28.

At the connecting end face 27 of each of the ferrules 16 and 25 is formed a pair of alignment holes 30 so that the arranged optical fiber group is put therebetween. One end of each alignment pin 31 is inserted in one alignment hole 30 of the ferrule 16. The base end side alignment pins 31 are fixed by a proper means. Thus, two alignment pins 31 are protruded forward from the connecting end face 27 of the ferrule 16. The optical fibers of both the ferrules 16 and 25 are positioned properly to realize an optical connection, since the alignment pins 31 are inserted in the alignment holes 30 of the ferrule 25.

Next, how to connect and disconnect the backplane connector in the above embodiment will be described with reference to FIG. 1 and FIG. 2. When connecting the backplane connector, the third housing 18 is fit in the first housing 3 of the object unit at the backplane 1 side by holding the package 2 at first as shown in FIG. 1A and FIG. 2A. Since the first housing 3 is mounted floating in the backplane 1 at this time, the first housing 3 can be moved relatively to the backplane 1 within the floating range. And, since the positioning error of the first housing 3 to occur with respect to the backplane 1 and the fixing error such as positional deviation to occur in fixing of the third housing 18 to the package 2 can be eliminated by a movement of the first housing 3 in floating, the first housing can be fit in the third housing properly.

Figure 8:
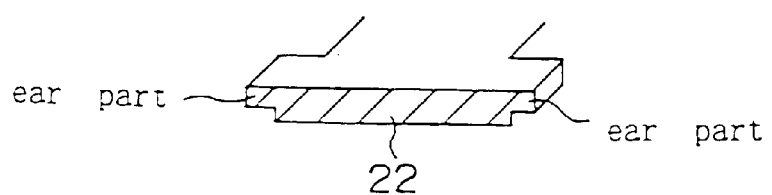
FIG. 8 illustrates a configuration of the tip side of the locking pawl provided for the third housing.

Furthermore, the third housing 18 is fit in the second housing 7 by moving the third housing 18 forward. Then, the ear part of the locking pawl 22 shown in FIG. 8 runs onto the running-on surface 6 of the first housing 3 (see FIG. 2A). When the connection of the backplane connector begins, the latching projection 4 of the first housing 3 is engaged with the engaging stepped portion 11 of the latching pawl 10 of the second housing 7 as shown in FIG. 1A, so that the first housing 3 is latchingly connected to the second housing 7.

When the third housing 18 is further moved forward, the alignment pins 31 of the backplane side optical connector plug 14 are inserted in the alignment holes 30 of the package side optical connector plug 23 to press the ferrules 16 and 25 so that the connecting end faces 27 of both the ferrules 16 and 25 come in close contact with each other. At this time, the locking pawl 22 goes beyond the running-on surface 6 to be latched by the locking latch 5. Thus, the first housing 3 is connected and locked to the third housing 18 (see FIG. 2B).

While in this connecting, the third housing 18 is further moved forward slightly from the state shown in FIG. 1A and the unlatching part 20 at the third housing 18 side is in contact with the tip side slope 13 of the latching pawl 10 at the second housing 7 side, so that the latching pawl 10 is pressed down slightly in the axial direction of the second housing 7 with the elastic force of the latching arm 8.

Figure 1B:
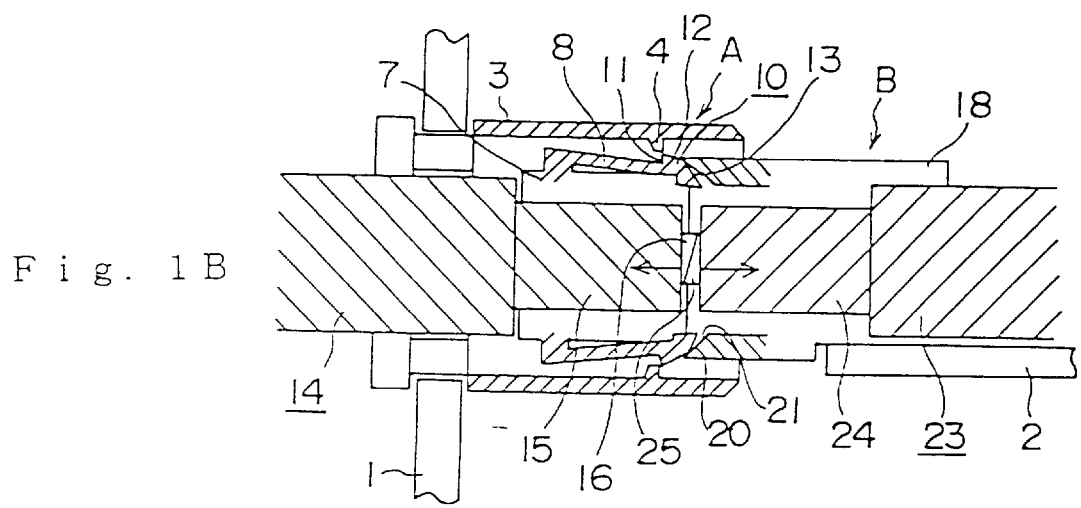
Figure 2A:
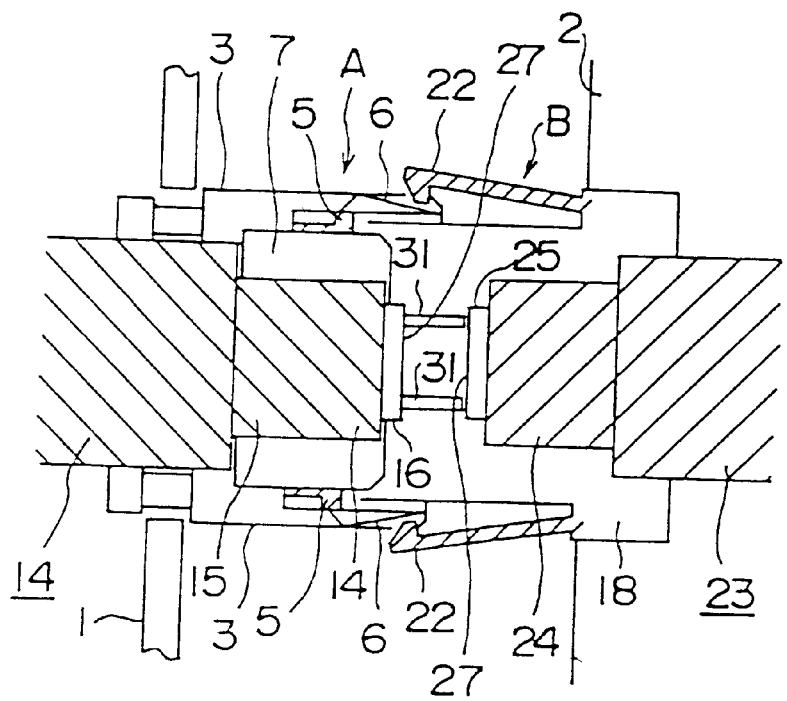
FIG. 2A and FIG. 2B illustrate a configuration of the backplane connector in the above embodiment, indicating how the backplane connector is locked and connected.

If the third housing is moved forward in this status, the ferrules 16 and 25 are pressed into the plug housings 15 and 24 respectively resisting the force of the spring 17 as shown in FIG. 1B. The latching pawl 10 is further pressed down by the unlatching part 20, so that the engaging stepped portion 11 of the latching pawl 10 is released from the latching projection 4 of the first housing 3. Thus, the first housing 3 is unlatched and disconnected from the second housing 7. In this unlatching status, a clearance is formed between the plug housings 15 and 24 at the backplane side and the package side as shown in FIG. 1B, so both plug housings 15 and 24 are separated from each other.

Figure 1C:
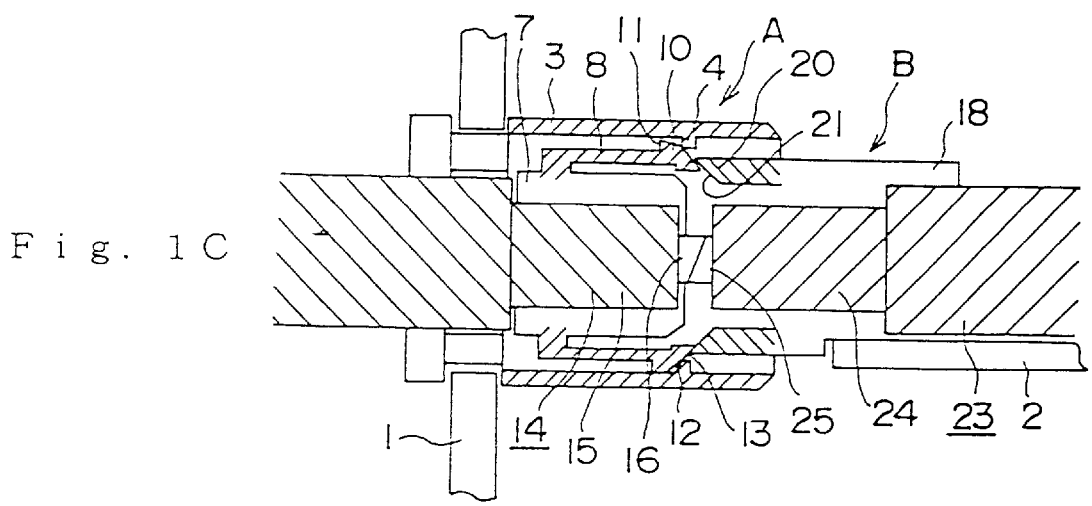

When the first housing 3 is unlatched and disconnected from the second housing 7 as shown in FIG. 1B, the first housing 3 is free from the second housing 7, and the first housing 3 is not pressed against the backplane 1 even when the third housing is further moved forward slightly. FIG. 1C shows the status in which the backplane connector is already connected. In this status, the first housing 3 is connected to the third housing 18, since the locking pawl 22 is locked and connected to the locking latch 5 (see FIG. 2B) as described above. The first housing 3 is unlatched and disconnected from the second housing 7. At this time, the connecting end face of the ferrules 16 and 25 of the backplane and the package side optical connector plugs 14 and 23 are in press-contact with each other. Thus, the optical fibers of the backplane side optical connector plug 14 and the package side optical connector plug 23 are aligned and connected optically. The optical fiber in the backplane side optical connector plug 14 is connected to an optical circuit on the backplane 1 and the optical fiber in the package side optical connector plug 23 is connected to an optical circuit of the package 2. Thus, the optical circuits on both the backplane 1 and on the package 2 are connected optically due to this connection of the backplane connectors.

Figure 2B:
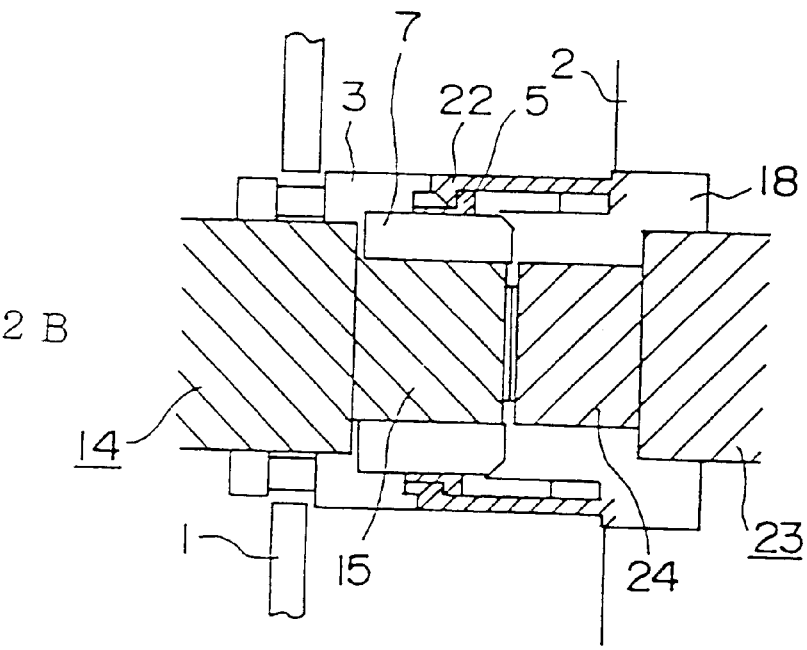

When disconnecting the backplane connector, the package 2 is held to remove the third housing 18. With this pulling-out force given to the third housing 18, the third housing 18 is moved in the pulling-out direction. At this time, since the positional relationship between the second housing 7 and the third housing 18 is as shown in FIG. 2B, that is, since the locking latch 5 is engaged with the locking pawl 22, the second housing 7 is moved together with the third housing 18 in the pulling-out direction, so that the engaging stepped portion 11 of the latching pawl 10 of the second housing 7 can be engaged with the latching projection 4 of the first housing 3. And, since the pressing-down force of the unlatching part 20 against the latching pawl 10 is released at that position, the latching pawl 10 returns to the initial position taken before the latching pawl 10 is pressed down by the elastic force of the latching arm 8. The engaging stepped portion 11 of the latching pawl 10 is engaged with the latching projection 4 of the first housing 3 as shown in FIG. 1A. And, the first housing 3 is latched and connected to the second housing 7 again.

Furthermore, when the third housing is moved in the pulling-out direction, the ear part of the locking pawl 22 runs onto the running-on surface 6 in the backward direction to release the locking pawl 22 from the locking latch 5, so that the connecting end faces of the ferrules 16 and 25 are separated from each other.

Furthermore, when the third housing 18 is disconnected and moved, the alignment pins 31 are pulled out of the alignment holes 30, so that the third housing 18 is removed completely from the first housing 3, ending the disconnection of the backplane connector.

The features of this embodiment are as follows; when backplane connector is to be connected, the first housing 3 can be unlatched and disconnected from the second housing 7 completely by pressing the third housing slightly, and when backplane connector is to be disconnected, the first housing 3 can be latched and connected to the second housing with a less force.

Figure 5:
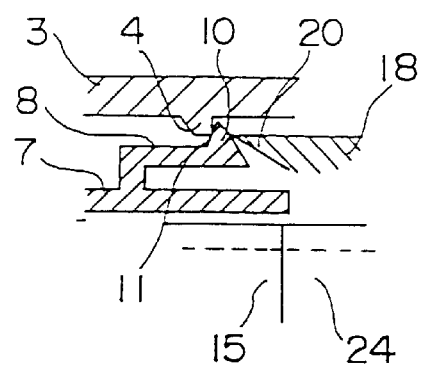
FIG. 5 illustrates a problem that the first housing cannot be unlatched from the second housing.
Figure 6:
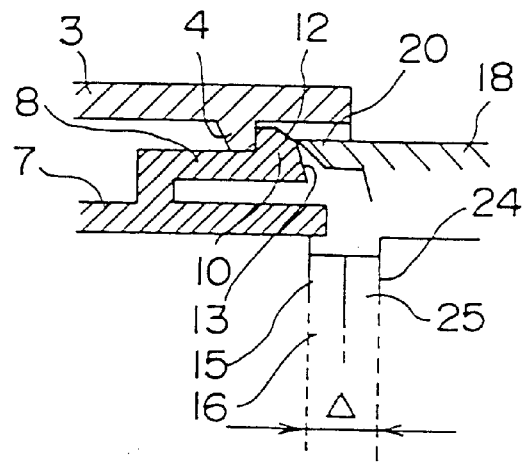
FIG. 6 illustrates an interval Δ between plug housings at the beginning of latched connection therebetween in the above embodiment.

When backplane connector is to be connected, for example, when the third housing is pushed in the connecting direction as shown in FIG. 5, the third housing 18 cannot be pushed in any longer if the plug housings 15 and 24 of the backplane side and the package side optical connector plugs 14 and 23 come in contact with each other before the unlatching part 20 at the third housing 18 side unlatches the latching pawl 10 from the latching projection 4. Consequently, the latched connection between the first and second housings 3 and 7 cannot be unlatched, so that the first housing 3 receives the force of pushing the third housing 18 down and this pushing-down force affects the backplane 1 via the first housing 3, causing a problem that the characteristics of the electric and optical circuits of the backplane 1 are degraded. In order to solve this problem, this embodiment provides the backplane connector with a configuration for unlatching the latched connection between the first housing 3 and the second housing 7 completely before the plug housing 15 comes in contact with the plug housing 24 when the third housing 18 is pressed down in the connecting direction.

This is why the slope provided on the outer surface of the latching pawl 10 is formed as a two-shoulder stepped one (package side slope 12 and tip side slope 13) in this embodiment as described above. And, if d is defined as the overlapping area of the latched connection between the latching projection 4 and the engaging stepped portion 11 of the latching pawl 10, $\Delta$ is defined as the interval between the plug housings 15 and 24 at the backplane 1 side and the package 2 side when the third housing 18 is fit in the first housing 3, $\theta_2$ is defined as the base end side inclination of the latching pawl 10, and $\theta_1$ is defined as the tip side inclination, then $\theta_1$ and $\theta_2$ are set to satisfy the relationship in the following expression (1).

$$0<\theta_2<\arctan(d/\Delta)<\theta_1<90° \quad (1)$$

In other words, if, when the latching projection 4 is engaged latchingly with the latching pawl 10, the overlapping area of the latching engagement is defined as d and the tip side inclination of the latching pawl 10 is defined as $\theta_1$, then the inserting length of the third housing 18, needed until the latched connection is unlatched after the unlatching part 20 comes in contact with the tip side slope 13 of the latching pawl 10, is represented as $d/\tan\theta_1$ ($0<\theta_1<90°$).

Furthermore, since the plug housings 15 and 24 are unlatched before they come in contact with each other, the condition of $d/\tan\theta_1<\Delta$ must be satisfied.

In other words, the relationship of $\theta_1>\arctan(d/\Delta)$ must be satisfied.

The value of $\Delta$ is about 0.4 to 0.8 mm for a multi-fiber optical connector plug. The value of d is 0.5 to 0.7 mm, but when in $\Delta=0.4$ mm, the result becomes $\theta_1>60°$.

On the other hand, when the package 2 is removed, that is, when the housing 18 is pulled out in the disconnecting direction, the force of latching the first housing 3 to the second housing 7 again is proportional to $\sin\theta_2$ ($0<\theta_2<90°$) if the inclination of the base end side slope 12 of the latching pawl 10 is $\theta_2$. Consequently, the larger the $\theta_2$ value becomes, the larger the latched reconnection force becomes. And, when this reconnection force becomes large, more force is needed to pull the third housing 18 out, so that it becomes difficult to connect and disconnect the package 2. This is unfavorable. Thus, connecting and disconnecting the package 2 must be done with a less force, and it should preferably satisfy the relationship of $\theta_2<45°$.

Consequently, the above expression (1) must be satisfied and this embodiment is designed to satisfy the relationship represented in the expression (1). Especially, in the case of $\Delta=0.4$ mm and $d=0.7$ mm, the relationship of $0<\theta_2<60°<\theta_1<090°$ should preferably be satisfied.

Since the latching pawl 10 has a two-shoulder stepped slope of $\theta_1$ and $\theta_2$ in this embodiment and the tip side slope 13 of the latching pawl 10 is given a larger inclination $\theta_1$, the latching connection between the first housing 3 and the second housing 7 can be unlatched and disconnected completely with a less inserting length of the third housing 18. In addition, since the base end side slope 12 of the latching pawl 10 is given a smaller inclination $\theta_2$, the first housing 3 can be latched and connected to the second housing 7 again with a less force when the package 2 is disconnected from the backplane connector, and the package 2 can be disconnected with a less force.

However, if the material strength of the ferrules 16 and 25 of the backplane side optical connector plugs 14 and the package side optical connector plugs 23 are weaker than those of the alignment pins 31, for example, if the ferrules 16 and 25 are made of plastic and the alignment pins 31 are made of metal or ceramics, the alignment pin 31 fixed to one of the optical connector plugs, that is, to the backplane side optical connector plug in this embodiment, must be sized so as to be fit surely in the alignment holes 30 of the package side optical connector plug ferrule 25.

In an optical connector plug, if, when the protrusion length from the plug housing 15 at the tip of the ferrule 16 is defined as f and the protrusion length of the alignment pins 31 from the end face of the ferrule 16 is defined as a, the inclination between the plug housings 15 and 24 is only $\alpha$ when the alignment pins 31 are fit in the alignment holes 30 after the second housing 7 begins to be fit in the third housing 18, then the alignment pins 31 are deviated from their due positions by $\tan\alpha\times(f+a)$ due to this inclination. This inclination $\alpha$ is decided by the clearance $\delta h$ formed after the fitting between the second housing 7 and the third housing 18 and the value of fitting length $L=L_0-a$ between these second and third housings 7 and 18. This $L_0$ is decided by the length in the fitting direction of the second and third housings 7 and 18. In other words, the positional deviation of the alignment pins 31 is represented by an expression of $\{\delta h/(L_0-a)\}\times(f+a)$.

The relative positional deviation between the second and third housings 7 and 18 is $\delta h/2$.

If the difference between the diameter of the alignment holes 30 and the tip diameter of the alignment pins 31 is assumed to be a $\delta\phi$, the relationship in the expression (2) must thus be satisfied to fit the alignment pins 31 in the alignment holes 30.

$$\delta\phi>\delta h/2+\{\delta h/(L_0-a)\}\times(f+a) \quad (2)$$

This embodiment is designed to satisfy the relationship in this expression (2).

Usually, the $\delta\phi$ size takes a value of 0.4 mm to 0.7 mm for manufacturing backplane connectors. The smaller the $\delta h$ value is, the more the positional deviation is reduced, but when manufacturing errors are taken into consideration, an error of about 0.1 mm will be neglectable. The f and a values are 0.9 to 1.1 mm and 1.6 to 3.3 mm respectively for standard multi-fiber optical connector plugs.

When those sizes are taken into consideration and, for example, alignment pins ($\delta\phi=0.7$ mm) are used, the relationship of $L_0>4$ mm must be satisfied as the fitting length between the second and third housings 7 and 18. If single-fiber optical connector plugs are used integrally for the second and third housings, the second housing 7 is arranged in a position about 3 mm deeper than the first housing 3. At this time, the L0 length will be about 2 mm. (However, in the case of a single-fiber optical connector plug, no alignment pin 31 is used. Thus, the fitting length can be longer by the length of the alignment pin 31 when the axial alignment is made between the ferrules of the backplane side optical connector plug and the package side optical connector plug.)

Figure 9:
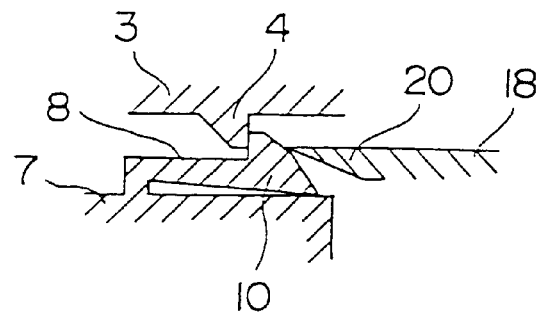
FIG. 9 illustrates a problem that the latching pawl at the second housing side cannot come in contact with the body of the second housing so as to be latched and connected.
Figure 10:
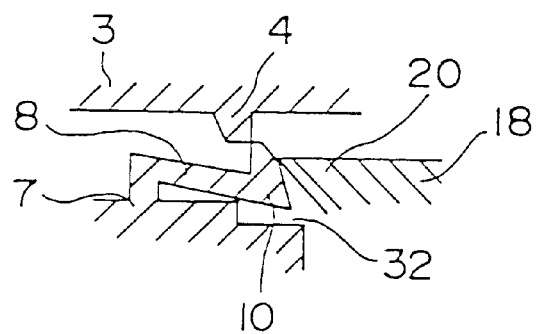
FIG. 10 illustrates a configuration for solving the problem shown in FIG. 9.
Figure 11:
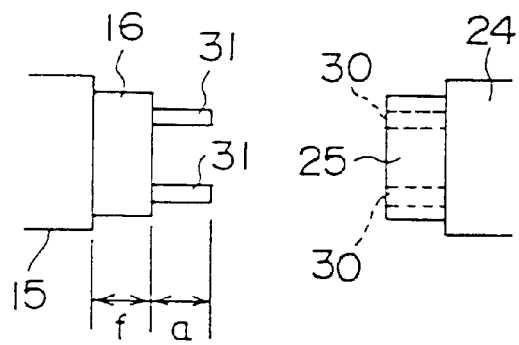
FIG. 11 illustrates in detail the tip where the backplane side optical connector plug is connected to the package side optical connector plug.

In the case of a backplane connector having a multi-fiber optical connector plug housed in the second and third housings 7 and 18 respectively just like that of this embodiment, the second housing is extended in the fitting direction to obtain $L_0=4$ mm. In other words, the second housing is arranged at a position about 1 mm deeper than the first housing 3. At this time, the latching pawl 10 of the second housing 7 must be prevented from coming in contact with the body of the second housing 7 (outer surface of the second housing) as shown in FIG. 9 when the first housing 3 is unlatched and disconnected from the second housing 7. As shown in FIG. 10, therefore, an escaping recess 32 must be formed on the outer surface of the second housing 7, so that the recess 32 can prevent the latching pawl 10 from coming into contact with the outer surface of the second housing 7.

Furthermore, in this embodiment, the fixing force of the alignment pins 31 is set enough to prevent the alignment pins 31 from being released from the alignment holes on the backplane optical connector plug when the backplane connector is disconnected. The alignment pins 31 are fixed on the backplane optical connector plug 14 side in this embodiment. More concretely, a part 33 as shown with an alternate long and short dash line in FIG. 3 is provided at the rear end side of the ferrule 16 to clamp the alignment pins 31 made of metal, ceramics, etc. The clamping part 33 is incorporated in the plug housing 15. And, the base end side of those two alignment pins 31 is clamped or bonded to this part 33. The force of fixing the alignment pins 31 is defined as $F_1$. If, when the backplane connector is connected, the package 2 is removed, then the third housing 18 receives a force in the pulling-out direction. The removing force at this time is defined as $F_2$.

This removing force is a force needed to latch and connect the first housing 3 to the second housing 7 again and to disconnect the first housing 3 from the third housing 18. When the latching projection 4 is latched and connected to the latching pawl 10 again to unlatch the locked connection between the locking latch 5 and the locking pawl 22 of the first and third housings 3 and 18 and disconnect the backplane connector, if a fitting deviation or an inclination occurs between the first housing 3 and the third housing 18, then the removing force of the third housing 18 works on the alignment pins 31, so that the alignment pins 31 are pulled out. In order to prevent the alignment pins 31 from being pulled out with the removing force, the fixing force $F_1$ of the alignment pins 31 must be kept larger than the removing force $F_2$ working when the third housing 18 is removed. With this, it is possible to prevent the alignment pins 31 from being released. Such the point is taken into consideration in this embodiment to set the fixing force $F_1$ of the alignment pins 31 larger than the removing force $F_2$.

In this embodiment, a fixing force of 1 to 2 kg is given for fixing the alignment pins 31 and the inventor has recognized that the removing force $F_2$ of the third housing is about 600 to 800 g through tests when the third housing is made of, for example, a plastic material such as PBT, PPS, etc. Thus, the above condition $F_1 > F_2$ can be satisfied enough.

The present invention is not limited only to the above embodiment, but the embodiment may be varied in various ways. For example, although the alignment pins 31 are fixed to the backplane side optical connector plug 14 in the above embodiment, the alignment pins 31 may be fixed to the package side optical connector plug.

Furthermore, although a multi-fiber optical connector plug is incorporated in the second and third housings 7 and 18 respectively in this embodiment, a single-fiber optical connector plug may be incorporated in those housings 7 and 18 respectively. When this single-fiber optical connector plug is incorporated, the alignment holes 30 and the alignment pins 31 may be omissible.

Furthermore, a plurality of optical connector plugs may be incorporated in the second and third housings 7 and 8 respectively. When a plurality of optical connector plugs are incorporated such way and a multi-fiber type optical connector plug is adopted as each of such the optical connector plugs, it is possible to realize a high density packing of optical fibers.

What is claimed is:

1. A backplane connector comprising a first housing mounted floating thereon, opened at its tip, and provided with a locking latch on its housing wall surface; a second housing inserted in said first housing with its tip opening arranged in the same direction as that of the tip opening of said first housing and incorporating at least one backplane side optical connector plug; and a third housing having a package on its outer surface, opened at the tip, having a package side optical connector plug therein, and having a locking pawl being fit in said first housing and to be engaged with said locking latch at a preset fitting position, wherein a latching projection is formed on the inner surface of said first housing, a latching arm is formed on the outer surface of second housing, which faces said latching projection formed surface of said first housing, said latching arm being extended toward the tip opening of said second housing along the outer surface of said second housing through a clearance, and at the tip side of said extended latching arm is provided a latching pawl having an engaging stepped portion protruded outside, and said latching projection of said first housing is engaged with this engaging stepped portion to latch and connect said first housing to said second housing, and at this latching pawl is formed a two-shoulder stepped slope whose inclination in the axial direction becomes larger from the base to the tip, and an unlatching part is formed at said third housing so that said third housing is fit in said first housing to let said unlatching part hit and come in contact with the tip side slope of said latching pawl, then said unlatching part presses said latching pawl down in the axial direction to unlatch and disconnect said first housing from second housing, and while in this unlatching status, the optical connection is kept between said backplane side optical connector plug and said package side optical connector plug.

2. A backplane connector as defined in claim 1, wherein said backplane side optical connector plug and said package side optical connector plug are positioned and connected to each other by fitting two alignment pins in a pair of alignment holes provided on the connecting end faces of said optical connector plugs on both sides.

3. A backplane connector as defined in claim 2, wherein two alignment pins are fixed to said optical connector plug at either said backplane side or said package side, and the fixing force is set larger than the force of reconnecting latchingly said first housing to said second housing when said third housing is removed from said first housing, as well as the force of unlocking and disconnecting said third housing from said first housing.

4. A backplane connector as defined in claim 3, wherein when said backplane connector is formed so that said alignment pins on one end side are fit in the alignment holes of said optical connector plug at either backplane side or package side and said alignment pins are also fit in the alignment holes of said other optical connector plug from the tip side from which said alignment pins are protruded to position and connect the optical connector plugs at said backplane side and said package side, if the fitting length of said second housing and said third housing when the alignment pins protruded from one of said optical connector plugs is fit in the alignment holes of the other optical connector plug is defined as L, the difference between the diameter of the tip of each of said protruded alignment pins and the diameter of each of the alignment holes in which said alignment pins are fit is defined as $\delta\phi$, the clearance formed after said second housing is fit in said third housing is defined as δh, the protrusion length of the ferrule protruded from the plug housing is defined as f, and the protrusion length of the alignment pins protruded from the end face of said ferrule is defined as a, then the relationship of δφ, >δ, h/2+(δh/L) (f+a) is satisfied.

5. A backplane connector as defined in claim 2, wherein when said backplane connector is formed so that said alignment pins on one end side are fit in the alignment holes of said optical connector plug at either backplane side or package side and said alignment pins are also fit in the alignment holes of said other optical connector plug from the tip side from which said alignment pins are protruded to position and connect the optical connector plugs at said backplane side and said package side, if the fitting length of said second housing and said third housing when the alignment pins protruded from one of said optical connector plugs is fit in the alignment holes of the other optical connector plug is defined as L, the difference between the diameter of the tip of each of said protruded alignment pins and the diameter of each of the alignment holes in which said alignment pins are fit is defined as δφ, the clearance formed after said second housing is fit in said third housing is defined as δh, the protrusion length of the ferrule protruded from the plug housing is defined as f, and the protrusion length of the alignment pins protruded from the end face of said ferrule is defined as a, then the relationship of δφ, >δh/2+(δh/L) (f+a) is satisfied.

6. A backplane connector as defined in claim 1, wherein each of said backplane side optical connector plug and said package side optical connector plug is being comprised of a plug housing incorporating a ferrule that houses an optical fiber, and the connecting end side of said ferrule is enforced by a spring and protruded slide-ability from the tip of said plug housing, and when the overlapping area of the engagement between said latching projection of said first housing and said engaging stepped portion of said latching pawl of said second housing is defined d, the interval between plug housings at said backplane side and said package side when said third housing is fit in said first housing is defined as Δ, the base end side inclination of said two-shoulder stepped slope of said second housing latching pawl is defined as $\theta_2$, and the tip side inclination is defined as $\theta_1$, then the relationship between $\theta_1$ and $\theta_2$ is assumed to be 0<$\theta_2$<arc tan (d/Δ)<$\theta_1$<90°.

* * * * *